United States Patent [19]

Hildebrandt

[11] Patent Number: 5,511,445
[45] Date of Patent: Apr. 30, 1996

[54] FLEXIBLE HAND GRIP FOR HANDLES

[76] Inventor: Robert C. Hildebrandt, R.D. 2, Box 2165, Brunswick, Me. 04011

[21] Appl. No.: 320,909

[22] Filed: Oct. 11, 1994

[51] Int. Cl.$^6$ .................................................. G05G 1/06
[52] U.S. Cl. ............................ 74/558.5; 74/558; 74/557; 16/110 R; 16/116 R; 16/DIG. 12; 81/177.1
[58] Field of Search ...................................... 74/558, 558.5, 74/557; 16/110 R, 116 R, DIG. 12, DIG. 18; 81/177.1; 24/306, 442; 2/17, 163, 170, 60, 59, 917, 920

[56] References Cited

U.S. PATENT DOCUMENTS

| | | | |
|---|---|---|---|
| 4,053,676 | 10/1977 | Kamistein | 16/110 R |
| 4,596,540 | 6/1986 | F'Geppert | 24/306 |
| 5,200,245 | 4/1993 | Brodrick, Jr. | 24/306 |

Primary Examiner—Rodney H. Bonck
Assistant Examiner—Chong H. Kim
Attorney, Agent, or Firm—Frederick R. Cantor

[57] ABSTRACT

A disposable, and reusable, hand grip is constructed as a flexible multi-ply band adapted to be wound around the circumference of a handle on a tool or other device, so that the person can exert an effective grip action on the hand grip. The multi-ply band includes a core sheet formed of a resilient foam material, a first surface sheet of rubber on one major face of the core sheet, and a second surface sheet of a woven fabric material on the other major face of the core sheet. The thickness of the band is designed to effectively increase the cross sectional thickness of conventional handles, so that the person has a more comfortable, less cramped, grip on the handle (hand grip).

3 Claims, 1 Drawing Sheet

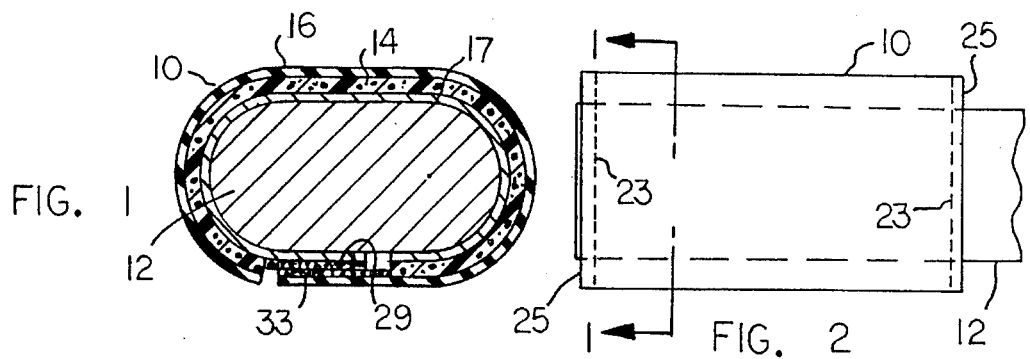
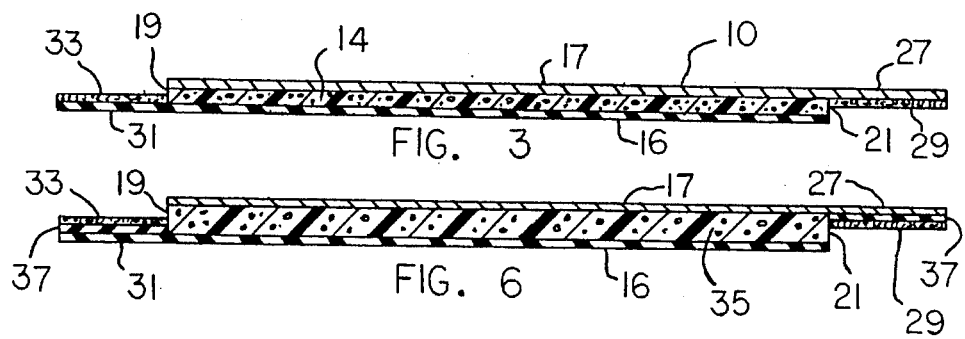
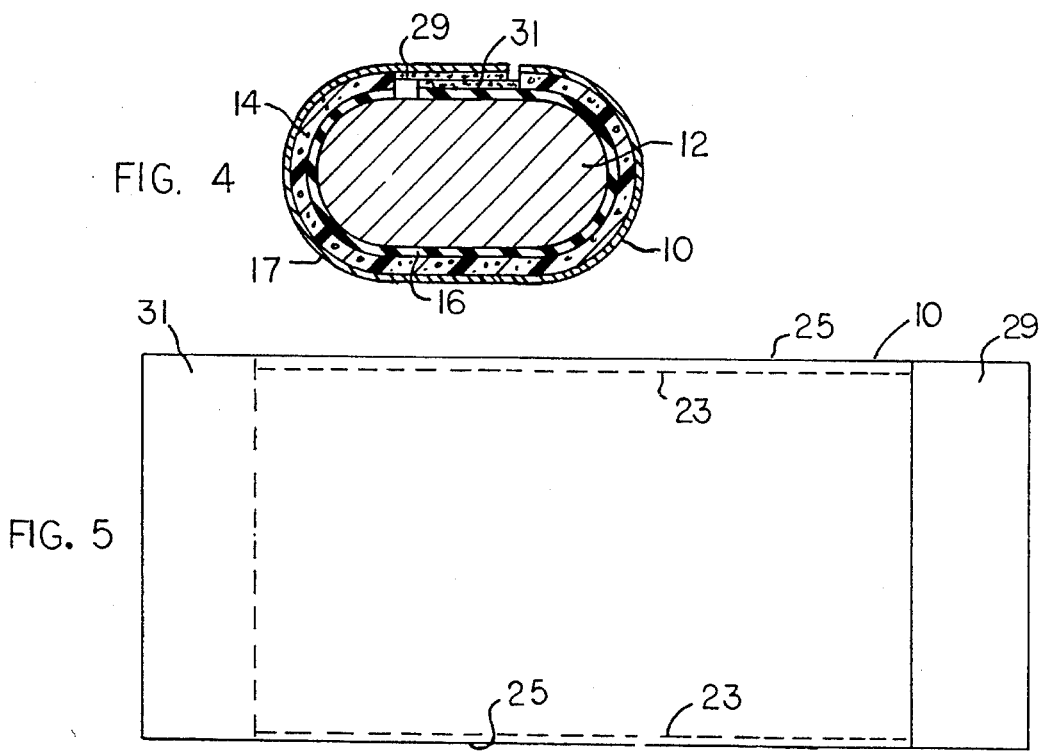

FLEXIBLE HAND GRIP FOR HANDLES

BACKGROUND OF THE PRESENT INVENTION

1. Field of the Invention

The present invention relates to flexible hand grips for handles.

The present invention relates to a flexible band that can be wound around a handle to form a hand grip. The band type hand grip can be used on handles associated with various devices, e.g., hammers, screw drivers, chisels, paint brushes, masonry tools, axes, shovels, lawn mowers, bicycles, etc.

2. Prior Developments

Tools, implements and other devices equipped with handles are sometimes difficult to grasp and control because the person's hand slips exerting force on the handle. In some cases, the hand slippage problem is aggravated by the fact that the handle has a cross sectional area that is smaller than the space circumscribed by an average person's hand in a normal curled condition suitable for gripping a handle; the person's hand is thus forced into an unduly small curl radius, which stretches the tendons, and leads to an uncomfortable cramped condition.

SUMMARY OF THE PRESENT INVENTION

An object of the present invention is to provide flexible hand grips for handles.

The present invention concerns a flexible band structure that can be wound around a handle to form a hand grip that is relatively comfortable for the person's hands. The band structure comprises three sheets, or plies, including a core sheet formed of a flexible foam material having resilience and compressibility. A surface sheet of rubber is laminated onto one face of the core sheet. Another surface sheet of woven cloth material, e.g., canvas, is laminated onto the other face of the core sheet.

The flexible foam core sheet has a significant thickness, e.g., about one eighth (⅛) inch, whereby the hand grip increases the effective cross-sectional dimension of the handle, so as to achieve a lesser stretching of the tendons in the person's hands, and a more comfortable grip on the hand grip surface. The foam core sheet also exhibits a degree of resilience and compressibility that enables the person's fingers to locally depress the hand grip surface and provide an enhanced gripping action on the hand grip.

Mating patches of fibrous hook and loop materials are secured to end areas of the surface sheets, so that when the multi-ply band is wound around a handle, the fibers in the mating patches interlock to retain the band structure on the handle. The use of mating patches of fibrous hook and loop material is advantageous in that the band structure can be quickly and readily installed on a handle, or removed from a handle, without tools or special implements.

In summary, and in accordance with the above discussion, the foregoing objectives are achieved in the following embodiments:

1. A flexible hand grip installable around a handle;
   said hand grip comprising a multi-ply band that includes a first core sheet of flexible foam material having first and second major faces;
   a second flexible surface sheet laminated to said first face of the core sheet;
   a third flexible surface sheet laminated to said second face of the core sheet;
   said core sheet having a first end and a second end;
   said second flexible sheet extending from said first end of the core sheet to a point beyond the second end of the core sheet to form a first attachment tab;
   said third flexible sheet extending from said second end of the core sheet beyond the first end of the core sheet to form a second attachment tab;
   a first patch of fibrous hook and loop material on said first attachment tab contiguous to said second end of the core sheet;
   a second patch of fibrous hook and loop material on said second attachment tab contiguous to said first end of the core sheet; and
   said first and second patches being formed of mating interlocking fibers whereby the patches adhere together when the multi-ply band is wound around a handle in a direction normal to the end edges of said core sheet.

2. The flexible hand grip, as described in paragraph 1, wherein said second flexible sheet is formed of rubber, and said third flexible sheet is formed of a woven fabric.

3. The flexible hand grip, as described in paragraph 1, wherein said core sheet has a thickness of about one eighth (⅛) inch.

4. The flexible hand grip, as described in paragraph 1, wherein said core sheet has a thickness of about one eighth (⅛) inch, said second sheet has a thickness of about 0.02 inch, and said third sheet has a thickness of about 0.02 inch.

5. The flexible hand grip, as described in paragraph 1, wherein said attachment tabs have the same face area.

6. The flexible hand grip, as described in paragraph 1, wherein the combined thickness of said fibrous patches is equal to the thickness of said foam core sheet.

7. The flexible hand grip, as described in paragraph 1, wherein said second and third sheets have the same face area.

BRIEF DESCRIPTION OF THE DRAWINGS OF THE PRESENT INVENTION

FIG. 1, is a sectional view, taken through a hand grip of the present invention installed on a handle. FIG. 1, is taken on line 1—1 in FIG. 2.

FIG. 2, is a side elevational view of the hand grip depicted in FIG. 1.

FIG. 3, is a sectional view, taken in the same direction as FIG. 1, but with the hand grip unfolded to a flat condition.

FIG. 4, is a sectional view, taken in the same direction as FIG. 1, but with the hand grip wound in an opposite direction so that the inner surface of the band becomes the outer surface.

FIG. 5, is a plan view, of the hand grip shown in FIG. 3.

FIG. 6, is a sectional view, taken in the same direction as FIG. 3, but illustrating another embodiment of the invention.

DESCRIPTION OF THE PREFERRED EMBODIMENTS OF THE PRESENT INVENTION

FIG. 1, is a sectional view, taken through a hand grip of the present invention installed on a handle. FIG. 1, is taken on line 1—1 in FIG. 2.

FIG. 2, is a side elevational view, of the hand grip depicted in FIG. 1.

FIGS. 1 and 2, show a flexible hand grip 10 wound around a handle 12. The handle 12 is shown fragmentarily disassociated from the device, or tool, on which it is used. That device, or tool, could take various forms, e.g., a hammer, paint brush, mallet, baseball bat, axe, hand saw, trowel or similar masonry tool, screw driver, shovel, golf club, lawn mower (handlebar) or bicycle (handlebar). Hand grip 10 is wound in a spiral fashion around the handle 12 to effectively achieve a thicker (larger diameter) handle, and also to provide a grip surface that is more resilient and deformable than the conventional hard-surfaced handle.

A thicker (larger diameter) handle is advantageous in that the person's hand does not have to be as tightly curled, whereby the tendons in the hand do not stretch to any great extent. The person has a less cramped, and more comfortable grip on the handle (handgrip) surface. The resilience of the hand grip is advantageous in that the person's fingers are enabled to depress the hand grip surface so as to minimize the possibility of slippage between the hand grip and the person's fingers. Handle 12 can have a range of different cross-sectional configurations, e.g., round, oval or hexagonal.

Hand grip 10 comprises a flexible multi-ply band that includes a core sheet 14 formed of a flexible foam material, such as foam rubber or non-rigid foamed plastic. A flexible surface sheet 16 is laminated to one major face of core sheet 14. Surface sheet 16 is preferably formed of sheet rubber having a relatively small thickness in relation to the thickness of core sheet 14. For example, core sheet 14 can have a thickness of about one eighth (⅛) inch, while surface sheet 16 can have a thickness of about 0.02 inch. Surface sheet 16 is relatively thin so as to be relatively flexible, while providing a protective covering over the relatively fragile core sheet 14.

A third surface sheet 17 is laminated to the other major face of core sheet 14 to provide further protection for the foam material. Sheet 17 is preferably formed of a woven cloth material, e.g. a light weight canvas material. The surface of the woven cloth (or fabric) can be coated with a thin latex film to give the surface a higher friction coefficient. The thickness of woven fabric sheet 17 can be about 0.02 inch.

The core sheet 14 can be laminated to surface sheets 16 and 17 by the use of adhesives applied to the major surfaces of the sheets. Additionally, it is preferred to sew the sheets together by means of two rows of stitches 23 extending along the side edges 25 of the band structure.

FIG. 3, is a sectional view, taken in the same direction as FIG. 1, but with the hand grip unfolded to a flat condition.

As shown in FIG. 3, sheet 17 has its left end located at the left end 19 of foam core sheet 14. Sheet 17 extends rightwardly beyond the right end 21 of foam core sheet 14 to form an attachment tab 27. A patch 29 of fibrous hook and loop material is sewn, or otherwise, affixed to tab 27, so as to be contiguous to the right end 21 of the foam core sheet.

Rubber surface sheet 16 has its right end located at the right end 21 of core sheet 14. Surface sheet 16 extends leftwardly beyond the left end of core sheet 14 to form an attachment tab 31. A patch 33 of fibrous hook and loop material is sewn, or otherwise, affixed to tab 31, so as to be contiguous with the left end 19 of core sheet 14.

Patches 29 and 33 are formed of fibrous hook and loop materials having adhesive properties. Preferred materials are commercially available under the tradename VELCRO. When the patches are facially engaged they adhere together to form an adhesive connection between surface sheet 16 and surface sheet 17.

FIG. 4, is a sectional view, taken in the same direction as FIG. 1, but with the hand grip wound in an opposite direction, so that the inner surface of the band becomes the outer surface.

The multi-ply band structure depicted in FIG. 3 can be wound around handle 12 in a direction normal to the end edges 19 and 21 of core sheet 14 to assume the condition depicted in FIG. 1 or the condition depicted in FIG. 4.

As shown in FIG. 1, the band structure is wound around the handle so that rubber sheet 16 forms the outer surface of the hand grip. As shown in FIG. 4, the band structure is wound around the handle so that woven fabric sheet 17 forms the outer surface of the hand grip.

The band structure is symmetrical so that in either condition of the band (FIG. 1 or FIG. 4), the adhesive fibrous patches 29 and 33 interlock together to retain the band in place on the handle. Sheets 16 and 17 have the same face area (and length), so that attachment tabs 27 and 31 have equivalent face areas; patches 29 and 33 are fully utilized for band fastener purposes.

In preferred practice of the invention, the hand grip has a relatively smooth continuous surface around the entire circumference of the handle so that there are no noticeable bumps or depressions in the hand grip surface.

As shown in FIG. 3, the combined thickness of patches 29 and 33 is approximately equal to the thickness of foam core sheet 14, so that the hand grip has approximately the same thickness at all points around the handle circumference.

The length of the hand grip is preferably approximately the same as the circumferential length of handle 12, so that the hand grip extends substantially entirely around the handle, as shown in FIGS. 1 and 4. If the handle circumference is too small to accommodate the length of the band structure, the ends of the attachment tabs 27 and 31 can be cut off with a scissors to effectively shorten the band structure to fit a particular handle. The patches 29 and 31 are preferably oversize so that even when some of the patch material is cut off, the patches will perform in the desired fashion.

It is contemplated that the flexible band structure will be marketed in various lengths so that any particular handle circumference can be accommodated by appropriate selection of a particular band length.

FIG. 6, is a sectional view, taken in the same direction as FIG. 3, but illustrating another embodiment of the invention.

The thickness of foam core sheet 14 can be varied while still practicing the invention. FIG. 6 shows a band structure wherein the resilient foam core sheet 35 is somewhat thicker than the corresponding core sheet 14 of FIG. 3. The adhesive patches 29 and 33 in FIG. 6 are effectively thickened by the use of spacer strips 37 between the patches and the attachment tabs 27 and 31. When the thicker band (FIG. 6) is wound around a handle the surface areas of the band will be essentially continuous, without bumps or depressions, due to the employment of spacer strips 37.

The thickness of foam core sheet 14 (or foam core sheet 35) can be varied, to achieve different hand grip thicknesses and different degrees of resilience, as desired to meet different conditions and individual preferences.

As previously noted, a principal aim of the invention is to provide a disposable and reusable hand grip having resilient cushioning properties, whereby the person can more effectively grip the handle in slip-free fashion. The hand grip effectively increases the circumference of the associated handle so that the person's hand comfortably grips the hand grip without feeling cramped or pinched.

The present invention, described above, relates to a flexible hand grip for handles. Features of the present invention are recited in the appended claims. The drawings contained herein necessarily depict structural features and embodiments of the flexible hand grip for handles, used in the practice of the present invention.

However, it will be appreciated by those skilled in the arts pertaining thereto, that the present invention can be practiced in various alternate forms and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A flexible hand grip installable around a handle;

said hand grip comprising a multi-ply band that includes a first core sheet of flexible foam material having first and second major faces;

a second flexible surface sheet formed of rubber, said second surface sheet being laminated to said first face of the core sheet;

a third flexible surface sheet formed of a woven fabric, said third surface sheet being laminated to said second face of the core sheet;

said core sheet having a first end edge (21) and a second end edge (19);

said second flexible surface sheet extending from said first end edge of the core sheet to a point beyond the second end edge of the core sheet, to form a first attachment tab (31);

said third flexible surface sheet extending from said second end edge of the core sheet beyond the first end edge of the core sheet to form a second attachment tab (27);

a first patch of fibrous hook and loop material on said first attachment tab contiguous to said second end edge of the core sheet;

a second patch of fibrous hook and loop material on said second attachment tab contiguous to said first end edge of the core sheet; and said first and second patches being formed of mating interlocking fibers, whereby the patches adhere together when the multi-ply band is wound around a handle in a direction normal to the end edges of said core sheet.

2. The flexible hand grip, as described in claim 1, wherein the combined thickness of said fibrous patches is equal to the thickness of said foam core sheet.

3. A flexible hand grip installable around a handle;

said hand grip comprising a multi-ply band that includes a first relatively thick core sheet of flexible foam material having first and second major faces;

a second relatively thin flexible surface sheet laminated to said first face of the core sheet;

a third relatively thin flexible surface sheet laminated to said second face of the core sheet;

said core sheet having a first end edge (21) and a second end edge (19);

said second flexible surface sheet extending from said first end edge of the core sheet to a point beyond the second end edge of the core sheet, to form a first attachment tab (31);

said third flexible surface sheet extending from said second end edge of the core sheet beyond the first end edge of the core sheet to form a second attachment tab (27);

a first patch of fibrous hook and loop material on said first attachment tab contiguous to said second end edge of the core sheet;

a second patch of fibrous hook and loop material on said second attachment tab contiguous to said first end edge of the core sheet;

said first and second patches being formed of mating interlocking fibers, whereby the patches adhere together when the multi-ply band is wound around a handle in a direction normal to the end edges of said core sheet; and the combined thickness of said fibrous patches being equal to the thickness of said foam core sheet.

* * * * *